United States Patent
Aarhus

(10) Patent No.: US 9,169,824 B2
(45) Date of Patent: Oct. 27, 2015

(54) WIND TURBINE HAVING INTERNAL TRANSPORTATION DEVICES SPECIFICATION IDENTIFICATION

(75) Inventor: Karl Aarhus, Silkeborg (DK)

(73) Assignee: GAMESA INNOVATION & TECHNOLOGY, S.L., Sarriguren (Navarra) (ES)

( * ) Notice: Subject to any disclaimer, the term of this patent is extended or adjusted under 35 U.S.C. 154(b) by 399 days.

(21) Appl. No.: 13/509,921

(22) PCT Filed: Nov. 18, 2010

(86) PCT No.: PCT/ES2010/000467
§ 371 (c)(1),
(2), (4) Date: May 15, 2012

(87) PCT Pub. No.: WO2011/061362
PCT Pub. Date: May 26, 2011

(65) Prior Publication Data
US 2012/0228880 A1    Sep. 13, 2012

(30) Foreign Application Priority Data
Nov. 20, 2009    (ES) .................................. 200902200

(51) Int. Cl.
*F03D 9/00* (2006.01)
*F03D 1/00* (2006.01)
*F03D 11/00* (2006.01)
(Continued)

(52) U.S. Cl.
CPC ............... *F03D 1/003* (2013.01); *F03D 11/00* (2013.01); *H02K 7/00* (2013.01); *H02K 7/1838* (2013.01); *F05B 2220/7066* (2013.01); *F05B 2240/916* (2013.01); *H02K 7/003* (2013.01); *Y02E 10/722* (2013.01); *Y02E 10/725* (2013.01); *Y02E 10/728* (2013.01)

(58) Field of Classification Search
CPC ... Y02E 10/728; Y02E 10/725; Y02E 10/722; F03D 1/003; F03D 11/00; H02K 7/1838
USPC .......................... 290/44, 55; 415/2.1, 4.1, 4.5
See application file for complete search history.

(56) References Cited

U.S. PATENT DOCUMENTS 6,285,090 B1 * 9/2001 Brutsaert et al. ............... 290/55
7,431,567 B1   10/2008 Bevington et al.
(Continued)

FOREIGN PATENT DOCUMENTS

DE    10 2004 030 929 B3    10/2005
WO         01/94779 A1    12/2001
(Continued)

*Primary Examiner* — Julio C. Gonzalez
(74) *Attorney, Agent, or Firm* — Ladas & Parry LLP

(57) ABSTRACT

The invention relates to a wind turbine with internal transport devices which comprises: a power train including a generator (41) located in front of the rotor (15) and actuated directly by said rotor (15), a tower (11) and a supporting structure (13) mounted on the tower (11); the rotor (15), which is supported by a main non-rotating shaft (29) connected to the supporting structure (13) by means of at least one bearing, comprising a hub (17) and at least one blade; the generator rotor (45) being rigidly connected to the rotor hub (17) and the generator stator (43) being rigidly connected to the main shaft (29), the main shaft (29) being a hollow shaft which includes one or more transport devices, such as a device (61) for transporting hanging loads or a carriage (71) for making it easier to replace parts of the generator and/or to transport persons.

9 Claims, 3 Drawing Sheets

(51) Int. Cl.
 *H02K 7/00* (2006.01)
 *H02K 7/18* (2006.01)

(56) References Cited

U.S. PATENT DOCUMENTS

| | | |
|---|---|---|
| 2003/0194310 A1 | 10/2003 | Canini et al. |
| 2004/0108733 A1 | 6/2004 | Wobben |
| 2006/0151767 A1* | 7/2006 | Wobben ........................ 254/334 |
| 2008/0272604 A1 | 11/2008 | Versteegh |
| 2008/0315594 A1 | 12/2008 | Casazza et al. |
| 2009/0267038 A1* | 10/2009 | Teichert et al. ................ 254/335 |
| 2011/0162194 A1* | 7/2011 | Sugimoto .................... 29/592.1 |
| 2012/0125876 A1* | 5/2012 | Park et al. ..................... 212/312 |
| 2014/0003943 A1* | 1/2014 | Valero Lafuente ........ 416/146 R |

FOREIGN PATENT DOCUMENTS

| | | | |
|---|---|---|---|
| WO | 02/33254 A1 | 4/2002 | |
| WO | WO 2010024510 A1 * | 3/2010 | ................ F03D 1/00 |
| WO | WO 2010032277 A1 * | 3/2010 | ............. H02K 15/00 |

* cited by examiner

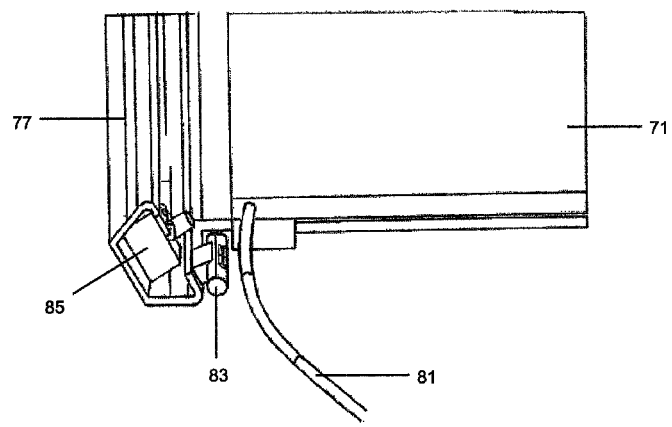
FIG. 6
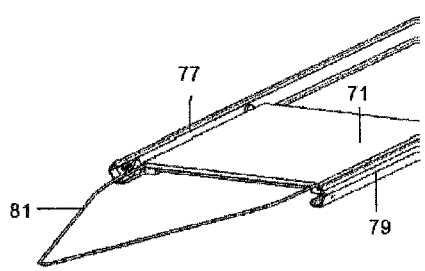
FIG. 7
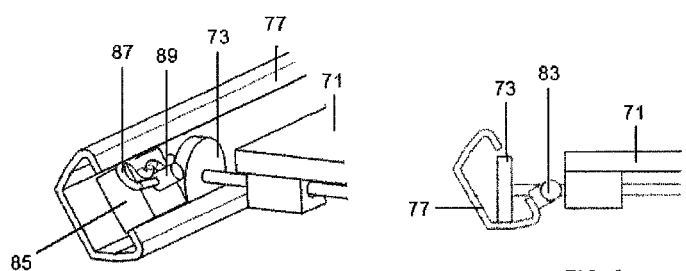
FIG. 8
FIG. 9

WIND TURBINE HAVING INTERNAL TRANSPORTATION DEVICES SPECIFICATION IDENTIFICATION

RELATED APPLICATION INFORMATION

This application is a 371 of International Application PCT/ES2010/000467 filed 18 Nov. 2010 entitled "Wind Turbine With Internal Transport Devices", which was published on 26 May 2011, with International Publication Number WO 2011/061362 A2, and which claims priority from Spanish Patent Application No. P200902200 filed on 20 Nov. 2009, the content of which is incorporated herein by reference.

FIELD OF THE INVENTION

This invention relates to a wind turbine and in particular to a wind turbine having a directly driven drive train.

BACKGROUND

Wind turbines are devices that convert mechanical energy to electrical energy. A typical wind turbine includes a nacelle mounted on a tower housing a drive train for transmitting the rotation of a wind rotor to an electric generator and other components such as a yaw drive which rotates the wind turbine nacelle, several controllers and a brake. The wind rotor comprises a rotor hub supporting a number of blades extending radially therefrom for capturing the kinetic energy of the wind and causing the driving train rotational motion. The rotor blades have an aerodynamic shape such that when a wind blows across the surface of the blade, a lift force is generated causing the rotation of a shaft which is connected—directly or through a gearing arrangement—to the electrical generator. The amount of energy produced by wind turbines is dependent on the rotor blade sweeping surface that receives the power from the wind and consequently increasing the length of the blades leads normally to an increase of the power output of the wind turbine.

A variety of drive train configurations without gearbox are known in the art.

In one of these configurations, the tower is located between the rotor hub and the generator. One example of these configurations is disclosed in WO 01/94779 A1 in which the connecting arrangement between the rotor hub and the generator is a two-part axle supported by two bearing units. Another example is described in WO 02/33254 A1 in which the connecting arrangement between the rotor hub and the generator is a main shaft supported by means of two bearings arranged on a base at the top of the tower.

In another of these configurations, the generator, having a large-diameter rotor and stator, is located between the rotor hub and the tower and the connecting arrangement between the rotor hub and the generator is a hollow shaft supported by bearings on a tube member (interior to the hollow shaft) attached to the supporting frame of the wind turbine. One example of these configurations is described in US 2004/0108733 A1 in which the hollow shaft is supported by means of a single bearing which also carries moments on the tube member. This configuration is intended to reduce the size and the weight of the elements of the wind turbine which are to be mounted at the top of the tower but has the drawback of a costly maintenance in particular when the dismounting of components is needed.

DE 102004030929 B3 discloses another configuration having the generator placed upwind to the rotor. It is suggested that this configuration involves several advantages with respect to the configurations with the generator placed between the rotor hub and the tower such as, particularly, allowing the exchange of the generator without dismounting the wind rotor, reducing loads and lightening risks on the generator and facilitating the access to the rotor hub for maintenance purposes. It is not known however any commercial implementation because this configuration involves several problems.

One of them is that the replacement of small generator components such as fans or seals may require that service personnel has to access to the generator inside from the front side of the generator and thus also move the spare parts along this path. This means that service personnel has to climb on the outside of the wind rotor and generator rotor, an action that implies a number of problems and risks. The biggest risk is that personnel can fall down from the wind turbine, which has fatal consequences. Additionally the transfer of spare parts along this route is difficult.

This invention is intended to solve this problem.

SUMMARY OF THE INVENTION

It is an object of the present invention to provide a wind turbine having the generator placed in front of the wind rotor that allows that service personnel can perform the replacement of small generator components without being involved in significant risks of suffering accidents.

It is another object of the present invention to provide a wind turbine having the generator placed in front of the wind rotor allowing an easy maintenance of small generator components.

These and other objects are met by providing a wind turbine comprising a tower, a supporting frame mounted on the tower, a directly driven drive train including a generator placed upwind a wind rotor which is supported by a non-rotating main shaft attached to the supporting frame by means of at least one bearing, being the generator rotor rigidly attached to the rotor hub and the generator stator rigidly attached to the main shaft, in which the main shaft is a hollow shaft that includes one or more internal transporting devices for facilitating the replacements of generator parts and/or the transport of persons.

In a preferred embodiment one of said transporting devices is a device, such as a roller skate, suitable for running along a guide placed along the upper edge of the main shaft inner surface, preferably a C-shaped bar with bended caps for retaining the roller skate, and having means for receiving a suspended load. Hereby it is achieved a wind turbine having a transportation device installed inside the main shaft which is able to move small generator components.

In another preferred embodiment one of said transporting devices is a trolley suitable for running on two guides, preferably C-shaped bars with bended caps for retaining the trolley wheels (preferably roller skates) placed along parallel edges in the lower part of the inner surface of a cylindrical main shaft. Preferably the trolley width W is comprised between 60%-90% the main shaft inner diameter D. Hereby it is achieved a wind turbine having a transportation device installed inside the main shaft which is able to move small generator components and also persons.

In another preferred embodiment the roller skate and/or the trolley are equipped with towing means. Hereby it is achieved a wind turbine having transportation devices installed inside the main shaft that can be easily moved by the maintenance personnel.

In another preferred embodiment the guides of the roller skate and/or the trolley include securing means at its ends such as cleats to which the roller skate and/or the trolley can be secured in a fixed position. Hereby it is achieved a wind turbine having transportation devices that can be kept installed inside the main shaft during several working days for the maintenance personnel or permanently.

In another preferred embodiment the guides of the roller skate and/or the trolley include removable stopping devices at any of its ends. Hereby it is achieved a wind turbine having transportation devices that can be easily installed and de-installed.

In another preferred embodiment the guides of the roller skate and/or the trolley are detachable attached to the flanges of the main shaft ends. Hereby it is achieved a wind turbine having transportation devices whose guides can be easy installed and de-installed on the main shaft flanges.

Other features and advantages of the present invention will be understood from the following detailed description in relation with the enclosed drawings.

BRIEF DESCRIPTION OF DRAWINGS

FIG. 6 is a partial perspective view of a trolley and one of its rail-guides according to the present invention.

FIG. 7 is a partial perspective view of a trolley and its rail-guides including towing means according to the present invention.

FIG. 8 is a partial perspective view of a trolley and one of its rail-guides including a stopping device according to the present invention.

FIG. 9 is a schematic section view of a trolley and one of its rail-guides including a securing device according to the present invention.

DETAILED DESCRIPTION OF PREFERRED EMBODIMENTS

Figure 1:
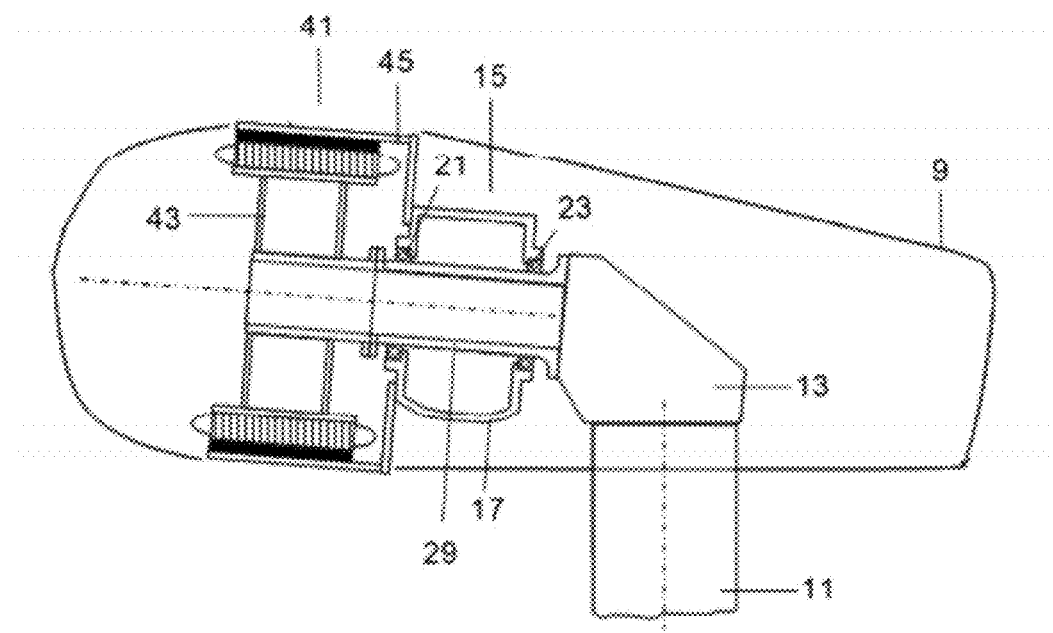
FIG. 1 is a schematic section side view of a wind turbine having the generator placed upwind the rotor.

The present invention refers to a wind turbine having the wind turbine generator placed in front (upwind) of the rotor hub, comprising, as shown in FIG. 1, a tower 11 supporting means housed inside a nacelle 9 for converting the rotational energy of the wind turbine rotor 15 into electrical energy by means of a generator 41. The wind turbine rotor 15 comprises a rotor hub 17 and, typically, three blades (not shown in FIG. 1). The rotor hub 17 is placed on two main bearings 21, 23, the first bearing 21 being placed near to the rotor hub front and the second bearing 23 near to the rotor hub rear. Both bearings 21, 23 are positioned on a non-rotating main shaft 29 connected to the wind turbine main frame 13. The generator stator 43 is connected to the non-rotating main shaft 29 and the generator rotor 45 is connected to the rotor hub 17.

Figure 2:
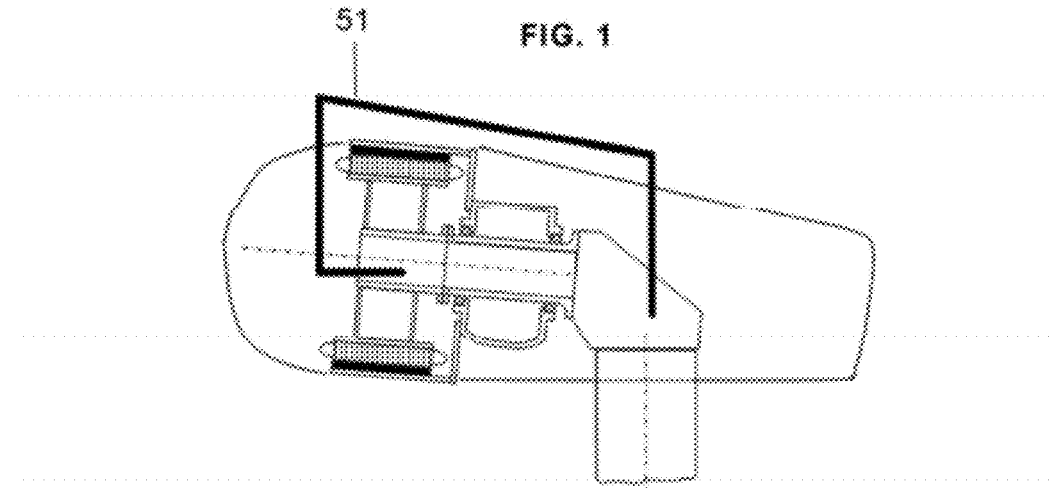
FIG. 2 is a schematic view of the access way to the generator in the wind turbine of FIG. 1.
Figure 3:
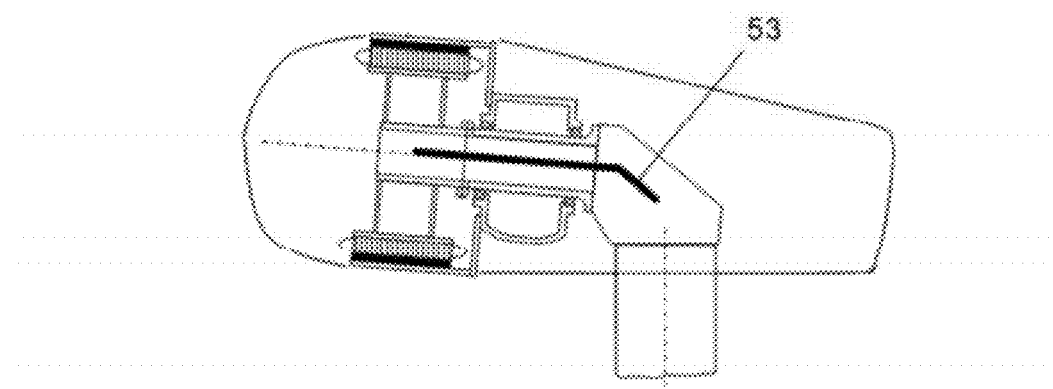
FIG. 3 is a schematic view of the access way to the generator in a wind turbine according to the present invention.

Instead of having an access way 51 to the generator 41 going outside the rotor hub 17 (see FIG. 2), the wind turbine is provided according to the present invention with an access way 53 to the generator 41 through the main shaft 29 (see FIG. 3) having one or more internal transportation devices suitable to carry persons and/or those generator internal parts that may need a replacement during the wind turbine life.

It is considered that this invention is applicable to wind turbines having cylindrical or conical main shafts 29 of circular, ellipsoidal or similar transversal sections. The internal dimensions of the hollow shaft 29 shall comply with the dimensions established in the corresponding regulations for allowing the access of persons.

Figure 4:
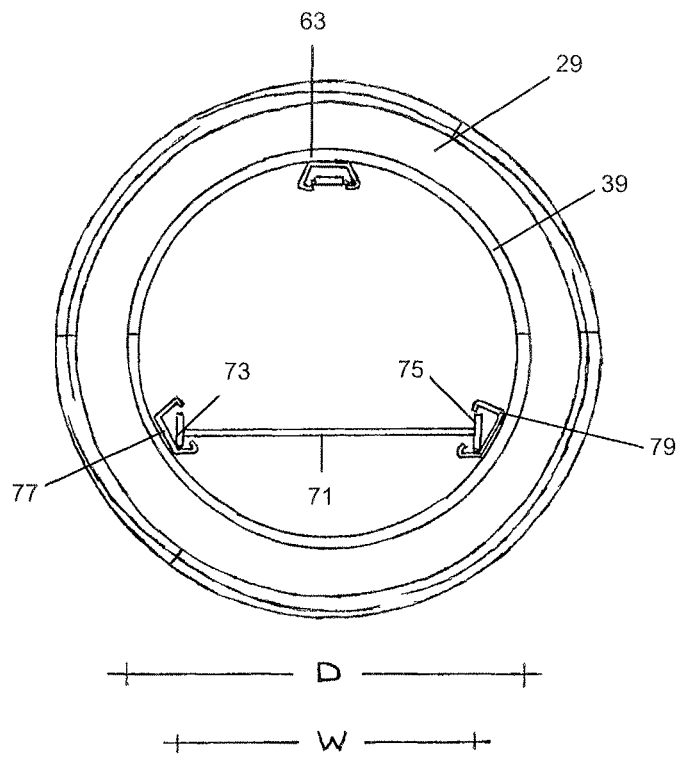
FIG. 4 is a schematic section side view of two internal transporting devices along the main shaft in a wind turbine according to the present invention.
Figure 5:
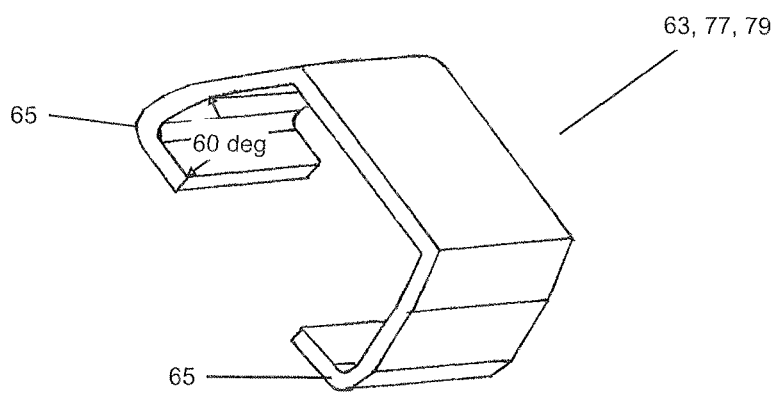
FIG. 5 is a schematic perspective view of a section of the rail-guide used by the transporting devices illustrated in FIG. 4.

In a preferred embodiment one of said transporting devices (see FIGS. 4-5) is a roller skate 61 having means (not shown in FIG. 4) for receiving a suspended load that can run along a guide 63 placed along the upper edge of the inner surface of a cylindrical or conical main shaft 29. Preferably said guide 63 is a C-shaped bar with bended caps 65 serving as a rail for the roller skate 61.

Using this device the service personnel that has accessed the generator 41 through the main shaft 29 bringing necessary tools can detach the defect component from it's fixation in the generator 41 and move it to the front end of the main shaft 29. Here the component is suspended in a string with a hook or a similar device, whose other end is attached to the roller skate 61 that moves the component to the rear end of the main shaft 29 where it is removed and substituted for the replacement component which is then moved to the front end of the main shaft 29.

In another preferred embodiment one of said transporting devices (see FIGS. 4-9) is a trolley 71 running on two guides 77, 79 placed along parallel edges in the lower part of a cylindrical main shaft 29 inner surface. Preferably said guides 77, 79 are also C-shaped bars with bended caps 65 serving as rails for the rolling skates 73, 75 of the trolley 71. As the skilled man will readily understand the trolley 71 may have a different type of wheels than roller skates and also a different number of wheels. Preferably the width W of the trolley 71 is comprised between 60%-90% the minimum inner diameter D of a substantially cylindrical main shaft 29. This device will be used in similar manner to the above-mentioned device for replacing generator components.

In another preferred embodiment, as illustrated in FIGS. 6 and 7, the trolley 71 is equipped with a rope 81 which enables a person to pull the trolley 71 towards him. The trolley 71 can be equipped with the rope 81 or any other suitable towing device in its rear end (the end close to the supporting frame 13), as illustrated in FIGS. 6 and 7, or both in its frontal and rear ends. The roller skate 61 may also be equipped with a rope or any other suitable towing device in a similar manner.

In another preferred embodiment, as illustrated in FIGS. 6 and 9, the guide 77 includes a cleat 83 at its rear end to which the trolley 71 can be secured in a fixed position. The guide 77 (and also the other guide 79) can be equipped with a cleat 83 or any other suitable securing device in its rear end, as illustrated in FIGS. 6 and 9, or both in its frontal and rear ends. The roller skate guide 63 may also be equipped with a cleat or any other suitable securing device in a similar manner.

In another preferred embodiment, as illustrated in FIGS. 6 and 8, the guide 77 includes a removable stopping device 85 at its rear end, having a pin 89 and a hairpin 87, preventing the trolley 71 from running too far. The guide 77 (and also the other guide 79) can be equipped with a stopping device in its rear end, as illustrated in FIGS. 6 and 8, or both in its frontal and rear ends. The roller skate guide 63 may also be equipped with a similar removable stopping device. When said stopping devices are removed the roller skate 61 or the trolley 71 can be removed and thus stored in a compact manner In another preferred embodiment the guides 63, 77, 79 are detachable attached to the flanges 39 of the main shaft 29 ends, thus avoiding bolting in the inner surface of the main shaft 29.

The present invention has among others the following advantages:

- It provides way of access to the generator for the maintenance personnel access without impairing any risk of falling down and without exposure to the outside environment.
- It provides a transportation system with no risk of accidentally dropping the defect generator parts and its replacement parts.
- There is no need of maintenance personnel securing means such as harness and strap on systems.
- The withdrawal/replacement of generator parts involves a short transportation distance.

Although the present invention has been fully described in connection with preferred embodiments, it is evident that modifications may be introduced within the scope thereof, not considering this as limited by these embodiments, but by the contents of the following claims.

The invention claimed is:

1. Wind turbine comprising a drive train including a generator (41) placed upwind of a wind rotor (15) which is directly driven by said wind rotor (15), a tower (11), and a supporting frame (13) mounted on the tower (11), wherein:
   a) the wind rotor (15), comprising a rotor hub (17) and at least one blade, is supported by a non-rotating main shaft (29) attached to the supporting frame (13) by means of at least one bearing;
   b) a generator rotor (45) is rigidly attached to the rotor hub (17), and a generator stator (43) is rigidly attached to the main shaft (29);
   wherein the main shaft (29) is a hollow shaft that includes one or more internal transporting devices (61, 71) placed along an inner surface of the hollow shaft for facilitating the replacements of generator parts and/or the transport of persons inside the wind turbine from a rear part of the wind turbine to a front part of the wind turbine, and wherein
   one of said transporting devices is a device (61) suitable for running along a rail-guide (63) placed along the upper edge of the inner surface of the main shaft (29) and having means for receiving a suspended load.

2. Wind turbine according to claim 1, wherein said device (61) is a roller skate and said guide (63) is a C-shaped bar with bended caps (65) for retaining the roller skate.

3. Wind turbine according to claim 2, wherein the roller skate (61) and/or the trolley (71) are equipped with towing means (81).

4. Wind turbine according to claim 2, wherein at the ends of any of said guides (63, 77, 79) there are securing means (83) to which the roller skate (61) and/or the trolley (71) can be secured in a fixed position.

5. Wind turbine according to claim 2, wherein at the ends of any of said guides (63, 77, 79) there is a removable stopping device (85).

6. Wind turbine according to claim 2, wherein any of said guides (63, 77, 79) are detachable attached to flanges (39) of the main shaft (29) ends.

7. Wind turbine according to claim 1, wherein one of said transporting devices is a trolley (71) suitable for running on two parallel guides (77, 79) placed in the lower part of the inner surface of the cylindrical main shaft (29).

8. Wind turbine according to claim 7, wherein the trolley has wheels (71) which are roller skates (73, 75) and the parallel guides (77, 79) are C-shaped bars with bended caps (65) for retaining the roller skates (73, 75).

9. Wind turbine according to claim 8, wherein a width W of the trolley (71) is comprised between 60%-90% of the inner diameter D of the main shaft (29).

* * * * *